United States Patent [19]
Watanabe et al.

[11] Patent Number: 5,449,150
[45] Date of Patent: Sep. 12, 1995

[54] VIBRATION DAMPING DEVICE WITH AN ELECTRODE AND HAVING ROLLING LOBES OF DIFFERENT RADII

[75] Inventors: Isao Watanabe, Iruma, Japan; David A. Weitzenhof, Akron; John D. Rensel, Tallmadge, both of Ohio; Saturo Kawamata, Tokyo, Japan

[73] Assignee: Bridgestone Corporation, Tokyo, Japan

[21] Appl. No.: 159,012

[22] Filed: Nov. 29, 1993

[51] Int. Cl.[6] .................... F16F 9/53; F16F 9/10; F16F 13/00
[52] U.S. Cl. .................. 267/64.24; 188/298; 188/267
[58] Field of Search ............ 267/140.14, 140.15, 267/64.19, 64.21, 64.23, 64.24, 64.27; 188/267, 276, 298, 322.5

[56] References Cited

U.S. PATENT DOCUMENTS

| | | | |
|---|---|---|---|
| 2,642,845 | 6/1953 | Stevens | 121/38 |
| 3,025,076 | 3/1962 | Davies et al. | 280/104 |
| 3,046,003 | 7/1962 | Schultz | 267/65 |
| 3,168,278 | 2/1965 | Ogden | 248/377 |
| 3,438,309 | 4/1969 | Boileau | 92/103 |
| 3,627,297 | 12/1971 | Gaydecki | 267/118 |
| 3,870,286 | 3/1975 | Willich | 267/64 R |
| 3,990,548 | 11/1976 | Schupner | 188/313 |
| 4,200,270 | 4/1980 | Merkle | 267/65 |
| 4,518,154 | 5/1985 | Merkle | 267/34 |
| 4,687,589 | 8/1987 | Block et al. | 252/73 |
| 4,854,555 | 8/1989 | Ohkawa et al. | 267/64.24 |
| 4,858,733 | 8/1989 | Noguchi et al. | 188/267 |
| 4,973,031 | 11/1990 | Takano et al. | 188/267 X |
| 5,180,145 | 1/1993 | Watanabe et al. | 267/64.24 |

FOREIGN PATENT DOCUMENTS

| | | | |
|---|---|---|---|
| 414508 | 2/1991 | European Pat. Off. | 188/298 |
| 478273 | 4/1992 | European Pat. Off. | 188/267 |
| 5149366 | 6/1993 | Japan | 188/298 |

Primary Examiner—Josie A. Ballato
Attorney, Agent, or Firm—David A. Thomas

[57] ABSTRACT

A vibration damping device includes axially spaced first and second end members adapted to be mounted on spaced apart structures. An intermediate member is mounted within an open end of the second end member. A center member consisting of a rigid tube having a hollow bore and a lower piston is connected to the first end member and extends through the interior of the intermediate member. The tube forms an annular orifice which extends about a rigid electrode rod which extends through the rigid tube and which is also connected to the first end member and piston but electrically isolated therefrom. A pair of elastomeric sleeves extend between the intermediate member and first end member and between the intermediate member and the piston to form a pair of fluid chambers communicating with the orifice and adapted to contain an electrorheological fluid. Each of the sleeves has a rolling lobe with circular centers and different radii of curvature. However, the circular centers of the rolling lobes lie on a common imaginary axially extending cylinder whereby the effective areas of the fluid chambers remain substantially equal as the device moves between jounce and rebound positions to reduce the spring rate effect on the damper. Even though the rolling lobes have the same circular centers the radii of the lobe forming walls are different which enables nesting of the piston within the intermediate member to reduce the axial height of the device without affecting its stroke length.

19 Claims, 6 Drawing Sheets

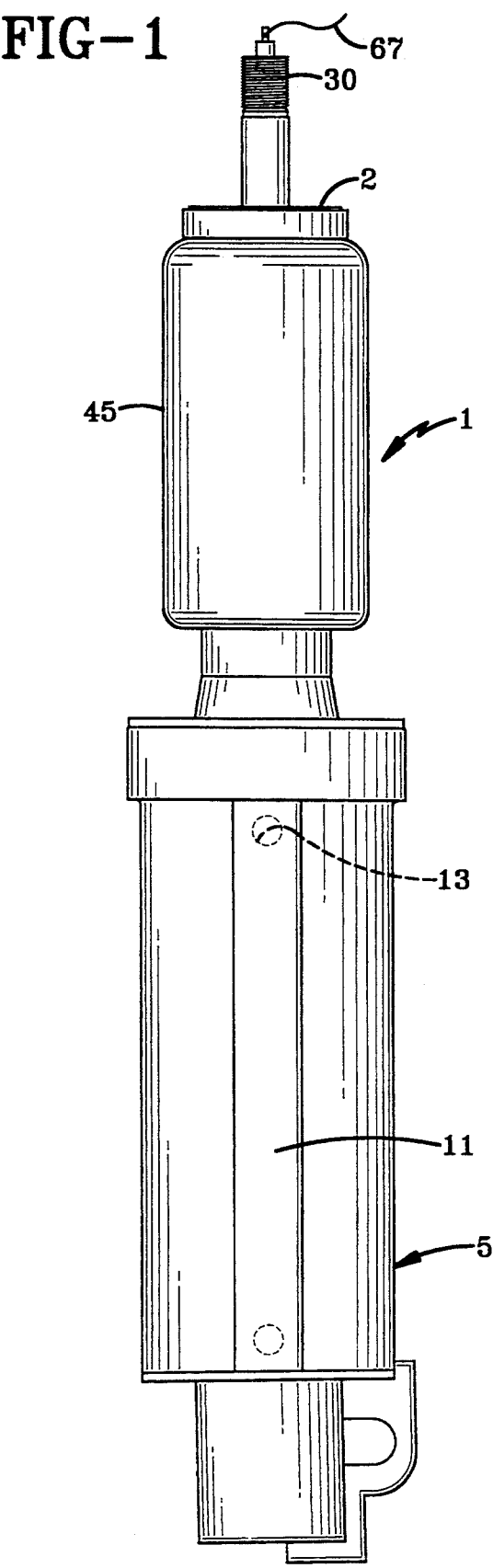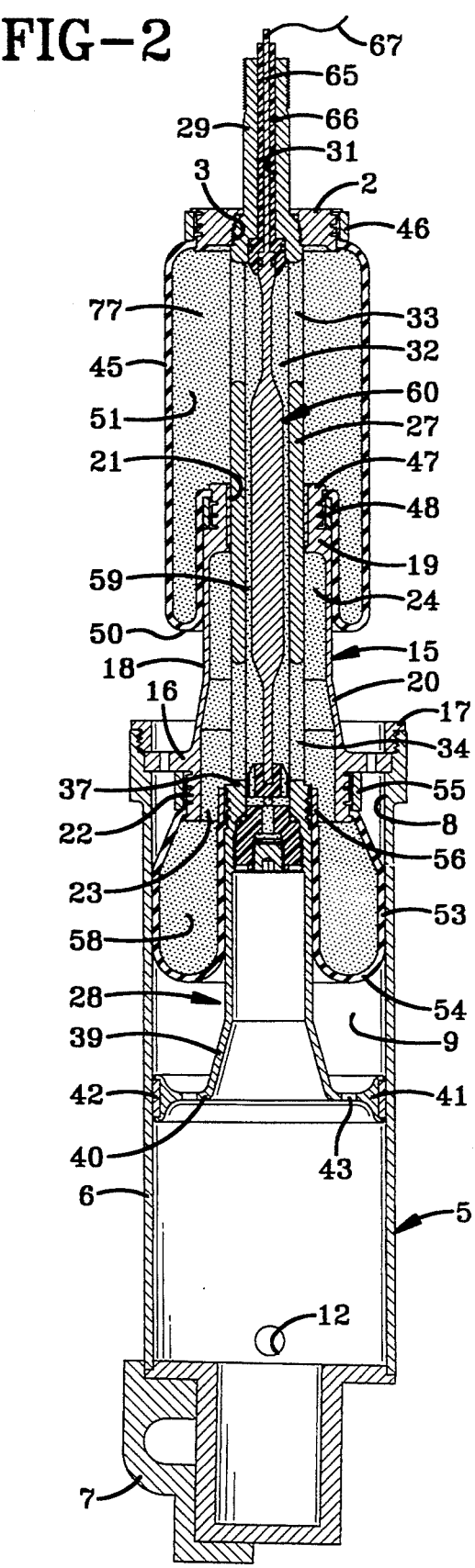

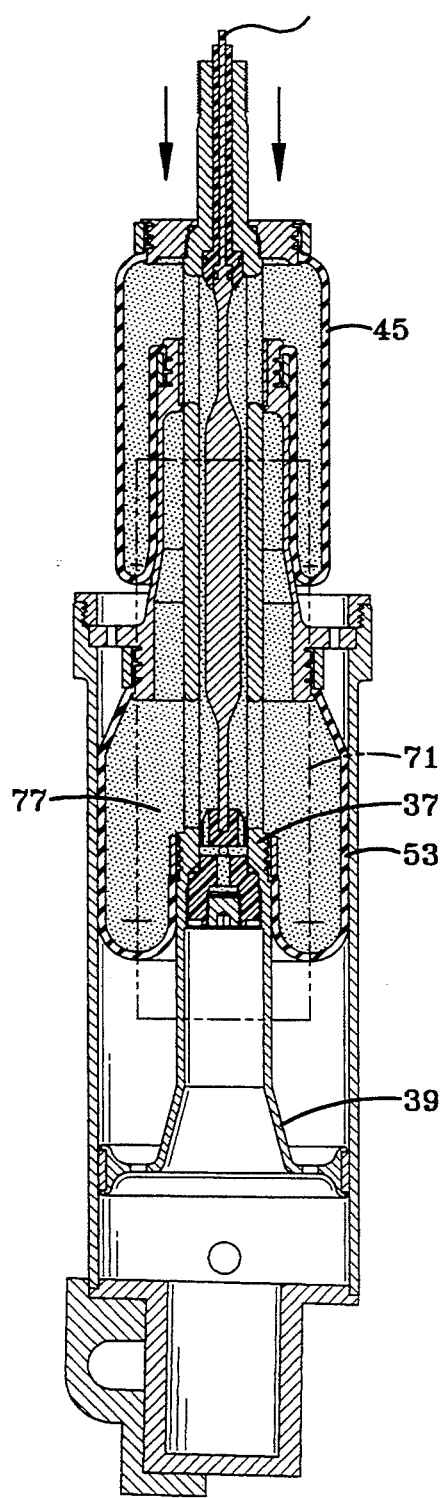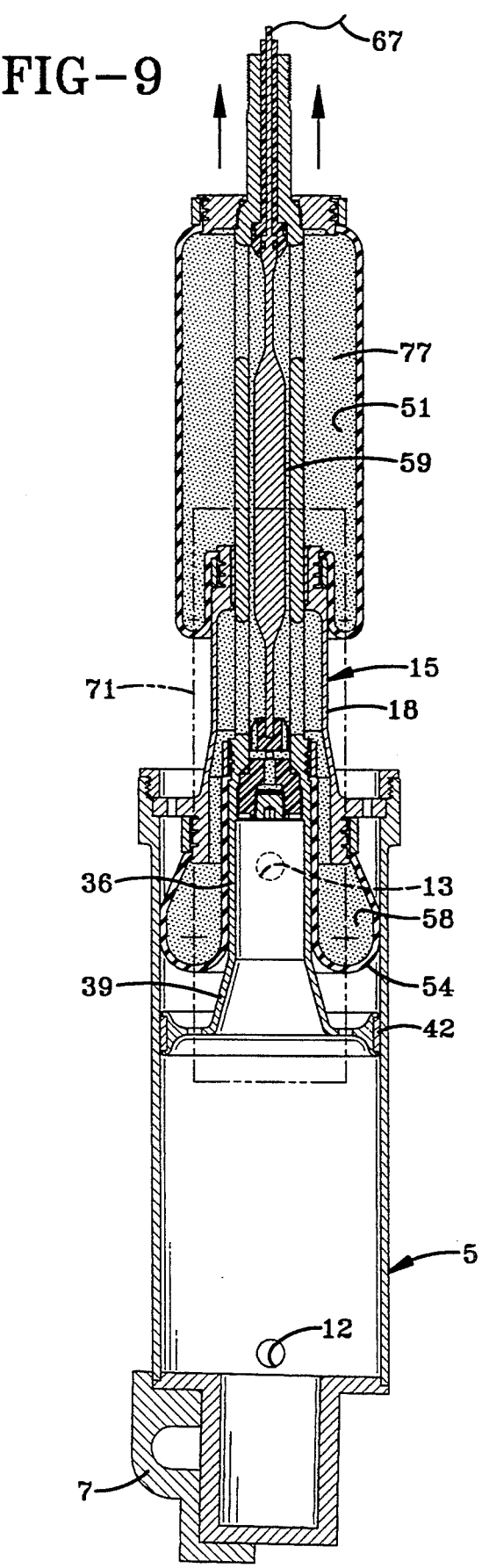

VIBRATION DAMPING DEVICE WITH AN ELECTRODE AND HAVING ROLLING LOBES OF DIFFERENT RADII

BACKGROUND OF THE INVENTION

1. Technical Field

The invention relates to vibration damping devices which develop damping performance when being applied to a suspension member such as for automobiles or other equipment. More particularly, the invention relates to such a damping device using an electrorheological fluid as the damping medium, which device has a shorter axial height than prior similar damping devices without sacrificing stroke length, and in which the spring rate of the device is minimized during damping by equalizing the effective areas of a pair of elastomeric sleeves which form fluid chambers that contain the electrorheological fluid.

2. Background Information

Vibration damping devices have been used for a considerable period of time to dampen the vibrational forces applied to the suspension system of vehicles to provide a smoother ride by reducing the vibrations caused by road bumps and depressions passing from the tires to the vehicle frame, by the interposing of oil filled shock absorbers or high pressure gas damping devices.

Although these prior art oil and high pressure gas damping devices have proven satisfactory, a more recent development has evolved in which an electrorheological or electroviscous liquid is used within the chambers of the damping device, wherein the liquid is in contact with one or more electrodes usually mounted in a restrictive passage, which depending upon the size of the electrodes and the amount of voltage applied to the liquid, will change the viscosity of the liquid, enabling the damping device to have a greater range of damping characteristics than those achieved by the high pressure gas or oil filled shock absorbers.

U.S. Pat. No. 4,973,031 discloses an anti-vibration apparatus which uses an expandable liquid chamber containing an electrorheological fluid in the chamber.

U.S. Pat. No. 4,858,733 discloses another damping device using electrodes in combination with an electroviscous liquid contained within closed chambers and movable through a restricted passage, where voltage is applied to the electroviscous liquid as it moves through the passage to change its viscosity to achieve various damping effects.

U.S. Pat. No. 5,180,145 discloses another vibration damping device which uses an electrorheological fluid which passes between two closed chambers formed by elastomeric sleeves through a restricted orifice where the fluid comes into contact with an electrode mounted in the restricted passage. The damping device of this patent provides for a shorter axial height than prior similar damping devices without sacrificing stroke length by the piston having a tapered outer surface which can be nested within the hollow interior of a rigid intermediate member through which the electrode extends, as well as permitting the rigid intermediate member to nest within the top annular housing. Thus, it provides a damping device having a shorter axial length without sacrificing stroke length.

However, one problem that exists with these prior art vibration damping devices using the pair of flexible sleeves interconnected through an orifice is that the effective area of the two fluid chambers vary as the fluid moves between the two chambers through the orifice as the damping device moves between jounce and rebound positions. This causes a spring rate effect which affects the vehicle ride and is undesirable for many vibration damping applications. This change in area occurs even if the pair of rolling lobes face each other as shown in U.S. Pat. Nos. 3,025,076, 4,200,270 and 4,518,154, and in pending EPO Application 0 414 508, or extend in the same direction such as shown in U.S. Pat. Nos. 3,627,297 and 4,854,555. This limits the versatility in characteristics desired to be achieved by the damping device for certain applications.

The effective area of a fluid filled elastomeric chamber is defined by the formula: Fluid Volume Displaced divided by the distance that the internal piston moves. In a damper using a pair of fluid pressure chambers separated by an orifice as in the present invention, it is desirable that both elastomeric sleeves replace the same volume for each increment of movement to prevent pressure building within one of the sleeves which results in sleeve stretch, and which causes the sleeve to act as a spring. In prior art damping devices using a pair of fluidly interconnected elastomeric sleeves, the maintaining of this equal effective area within the pair of sleeves was not possible.

Thus, the need exists for an improved damping device which has a pair of fluid chambers formed by flexible elastomeric sleeves connected by an elongated annular orifice, which orifice contains an electrode when used with an electrorheological fluid, which has a shorter axial length than that of similar damping devices without shortening the stroke length; and in which the effective areas of the pair of elastomeric sleeves remain generally equal to provide a relatively low spring rate as the damping device moves between jounce and rebound positions.

SUMMARY OF THE INVENTION

Objectives of the invention include providing an improved vibration damping device preferably of the type adapted to be incorporated within a vehicle suspension system which reduces the axial length thereof without reducing the stroke length and which enhances the damping characteristics achieved thereby.

A still further objective of the invention is to provide such a damping device which when used with an electrorheological fluid enables the restrictive orifice and associated electrode to vary in length independent of stroke length in order to achieve various damping characteristics.

Another objective of the invention is to provide such a damping device wherein internal members of the device are nestable within each other to enable the axial length or height thereof to be reduced without sacrificing the damping effect achieved thereby.

A still further objective of the invention is to provide such an improved damping device which may be incorporated within a usual air spring for various suspension applications without affecting the basic construction and arrangement of the electrorheological fluid damping portion thereof.

A further objective of the invention is to provide such an improved damping device in which the rolling lobes of the two elastomeric sleeves of the device extend in the same direction and are adapted to move along an imaginary axially extending cylindrical surface when the device moves between jounce and rebound positions, and in which the rolling lobes of the elastomeric sleeves have circular centers with different length radii, yet the circular centers of the lobes lie on the imaginary axially extending cylinder extending between the lobes so that the effective areas of the fluid chambers remain generally equal as the rolling lobes move along their respective member when the device is absorbing vibration to reduce the formation of spring rate characteristics which would heretofore occur with prior art damping devices using a pair of elastomeric sleeves and rolling lobes, and which will maintain the pressure within the two chambers substantially equal.

Another objective of the invention is to provide such an improved damping device which expands the range of displacement of the device without increasing spring rate generated by the elastomeric cord reinforced sleeves thereof and which uses the bias angles of the reinforcing sleeve cords to provide better control of the sleeves during their movements between jounce and rebound positions.

A still further objective of the invention is to provide such an improved damping device which is of a rugged, compact, relatively lightweight design, and which achieves the objectives in a relatively simply and efficient manner.

These objectives and advantages are obtained by the improved damping device of the invention, the general nature of which may be stated as including an end member; a rigid intermediate member having an annular outer wall extending generally axially from an end wall and terminating in an open end and having a hollow interior, said end wall having a central opening formed therein; a first elastomeric sleeve extending between and sealing connected to the end member and to the end wall of the intermediate member and forming a first fluid chamber, said first sleeve having a rolling lobe extending along the annular outer wall of the intermediate member; a rigid housing having a hollow interior and formed with an open end, said intermediate member being mounted within said open end of said rigid housing; a piston having a hollow interior formed by an annular axially elongated outer wall, said piston being reciprocally movable within the hollow interior of the rigid housing when the damping device moves between jounce and rebound conditions; a second elastomeric sleeve extending between and sealingly connected to the intermediate member at the open end thereof and to an end of the piston and forming a second fluid chamber, said sleeve having a rolling lobe extending within the hollow interior of the rigid housing and along the outer wall of the piston; a rigid tube having a bore extending between and connecting the end member to the piston, said tube extending through the first fluid chamber and through the central opening of the end wall and through the hollow interior of the intermediate member, said tube being formed with first and second axially spaced fluid passages, said first passage communicating with the first fluid chamber and said second passage communicating with the second fluid chamber; an electrode mounted within the bore of the rigid tube and electrically isolated therefrom and forming an orifice therebetween; and the rolling lobes of the first and second elastomeric sleeves having circular centers with first and second radii respectively, with the second radius being greater than the first radius and with the circular centers of the lobes lying on an imaginary axially extending cylinder extending between said lobes.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 1 is a side elevational view of the improved damper in an at-rest position;

FIG. 2 is a longitudinal sectional view of the damper of FIG. 1;

FIG. 8 is a sectional view similar to FIG. 2 showing the damper moving toward a jounce position;

FIG. 9 is a sectional view similar to FIG. 8 showing the damper moving towards a rebound position;

Similar numerals refer to similar parts throughout the drawings.

DESCRIPTION OF THE PREFERRED EMBODIMENTS

Figure 3:
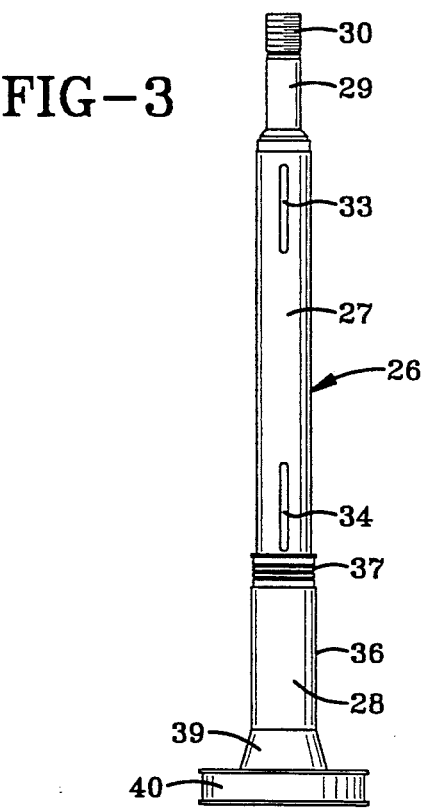
FIG. 3 is a side elevational view of the rigid tube and piston member removed from the damper of FIGS. 1 and 2.
Figure 4:
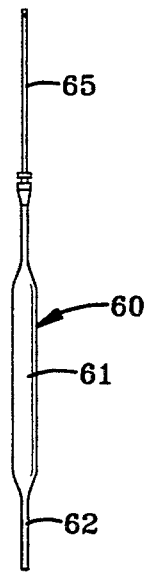
FIG. 4 is a side elevational view of the electrode removed from the damper.

The improved vibration damping device of the invention is indicated generally at 1, and the first embodiment thereof is shown in FIGS. 1-9. Device 1 includes a top end plate member 2 which is formed with a central opening 3. End plate 2 is adapted to be connected to a supporting structure such as a vehicle, so that device 1 can provide damping thereto upon the vehicle tires experiencing depressions and bumps in a road surface.

The opposite end of damping device 1 includes a rigid inverted cup-shaped housing indicated generally at 5, formed by a cylindrical sidewall 6 and a bottom end mounting bracket 7 for mounting device 1 on another supporting structure. Housing 5 terminates in an open upper end 8 and forms a hollow interior 9. Housing 5 preferably is formed of a rigid lightweight metal, such as aluminum. An external fluid passageway is formed by a channel member 11 which extends along the outer surface of housing wall 6 and provides communication between the lower end of housing interior 9 through a lower port 12 and the upper portion of housing interior 9 through a port 13.

A rigid intermediate member indicated generally at 15, is mounted within open end 8 of housing 5 by an annular flange 16 and a threaded clamping washer 17. Intermediate member 15 includes a generally cylindrical wall 18 which is connected to a top wall 19 which is formed with a central opening 21, and has a lower outwardly flared conical wall portion 20 which extends between cylindrical wall 18 and annular flange 16. An annular collar 22 extends axially downwardly from flange 16 and forms a bottom open end 23 of intermediate member 15. Walls 18, 19 and 20 and collar 22 form a hollow interior 24. Member 15 also is preferably formed of a lightweight metal such as aluminum, as is housing 5.

A preferably one-piece elongated center member indicated generally at 26 (FIG. 3), is attached to top end plate member 2 and extends through opening 21 of intermediate member top wall 19 and into interior 9 of bottom housing 5. Center member 26 also is preferably formed of a lightweight metal such as aluminum, and has a tubular upper portion 27 which is integrally connected to a lower piston 28. Tube 27 terminates in a top post 29 having external threads 30 formed thereon for attaching device 1 to the structure on which device 1 is to be utilized. Post 29 is formed with a hollow bore 31 which communicates with a hollow interior 32 which extends throughout the length of tubular portion 27. Upper and lower fluid elongated passage slots 33 and 34 are formed in tubular portion 27 and communicates with hollow interior 32.

Piston 28 includes a cylindrical wall 36 which terminates in upper annular collar 37 (FIG. 5) which is formed with a plurality of annular grooves therein. Cylindrical wall 36 terminates in an outwardly flared bottom conical wall 39, which terminates in a radially outwardly extending annular flange 40 which has an annular end bracket 41 for holding a cylindrical bearing bushing 42 therein. Bushing 42 provides for sliding contact with the inside surface of sidewall 6 of lower housing 5. A plurality of circular spaced holes 43 are formed in annular flange 40 (FIG. 2) to provide fluid communication between the upper and lower portions of housing 5 as piston 28 moves reciprocally therein as described below.

A first elastomeric sleeve 45 has one of its open ends clamped and sealed against the outer periphery of top end plate 2 by a clamping ring 46. The opposite open end of elastomeric sleeve 45 is secured in a fluid tight clamping engagement with an annular shoulder 47 at the top of intermediate member 15 by another clamping ring 48. This end of sleeve 45 is provided with a rolling lobe 50, which when the damper is in a generally at-rest position as shown in FIGS. 1 and 2, extends partially along cylindrical wall 18 of intermediate member 15. The interior of elastomeric sleeve 45 forms an upper fluid chamber 51.

A second elastomeric sleeve 54 is secured in a fluid tight relationship with annular collar 22 of intermediate member 15, by a clamping ring 55. The other open end of elastomeric sleeve 54 is secured and sealed in a fluid tight relationship, by a similar clamping ring 56 against annular collar 37 at the upper end of piston 28. Hollow interior 24 of intermediate member 15, in combination with the hollow interior of sleeve 54, forms a second fluid chamber 58 which communicates with upper fluid chamber 51 through an elongated annular orifice 59 which is formed between an electrode 60 and the interior of tubular upper portion 27.

Figure 5:
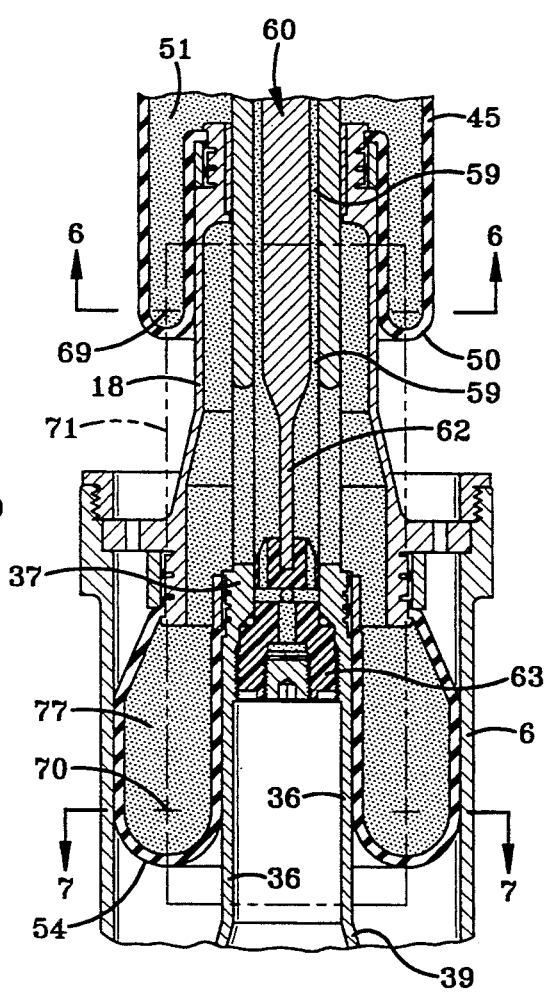
FIG. 5 is an enlarged fragmentary sectional view showing the unique relationship between the rolling lobes of the two elastomeric sleeves.

Electrode 60 (FIG. 4) is formed of an electrically conductive material and has a generally cylindrical-shaped central portion 61 which terminates in a reduced diameter lower stem 62, which is mounted within piston collar 37 by a dielectric isolator 63 (FIG. 5). An upper stem 65 of electrode 60 extends through bore 31 of post 29 and is electrically isolated therefrom by a dielectric isolator sleeve 66 (FIG. 2). Electrode 60 is connected to a high voltage generating means (not shown) through a wire 67 which applies a positive voltage to the electrode.

Figure 6:
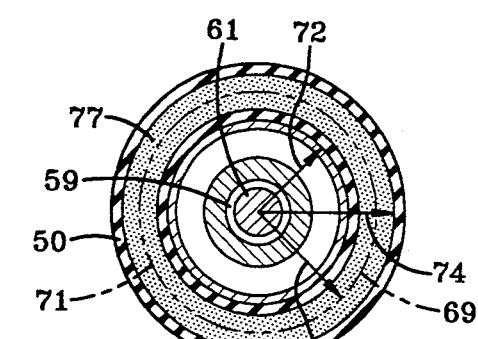
FIG. 6 is a sectional view taken on line 6—6, FIG. 5.
Figure 7:
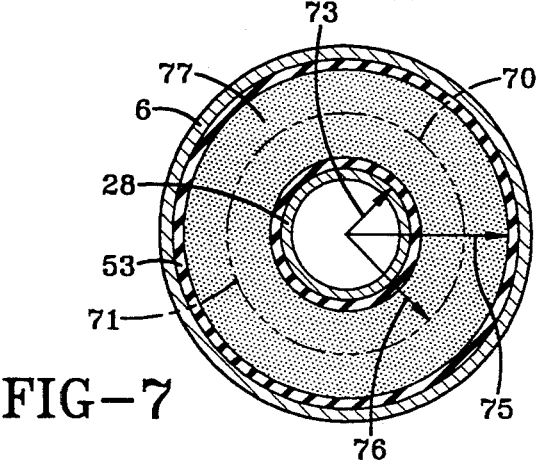
FIG. 7 is a sectional view taken on line 7—7, FIG. 5.

In accordance with one of the main features of the invention which is shown diagrammatically in FIGS. 5, 7 and 8, each of the rolling lobes 50 and 54 have circular center lines indicated at 69 and 70 respectively, which lie on an imaginary cylinder 71 extending axially therebetween, as shown in FIG. 5, which cylinder has a radius 76. As shown in FIGS. 5–7, the inner radius 72 of lobe 50 of upper sleeve 45, is greater than inner radius 73 of lobe 54 of lower sleeve 53. However, outer radius 74 of lobe 50 is smaller than outer radius 75 of lobe 54.

The operation of improved damping device 1 is best illustrated by reference to FIGS. 2, and 5–9. FIG. 2 shows damping device 1 in its usual at-rest position wherein fluid 77 will generally fill upper fluid chamber 51, lower fluid chamber 58, which includes hollow interior 24 of intermediate member 15. Electrorheological fluid 77 preferably is of the type discussed in U.S. Pat. Nos. 4,858,733, 4,973,031 and 4,687,589. Upon the vehicle or other equipment on which device 1 is mounted, experiences road bumps and depressions, device 1 will move between a partial rebound position as shown in FIG. 9, and a partial jounce position as shown in FIG. 8. During this movement, fluid 77 will pass through orifice 59 caused by the movement of piston 28 and connected top end plate 2, with respect to lower housing 5 and connected intermediate member 15, providing the desired damping effect in relationship to the voltage applied to electrode 60.

In accordance with one of the main features of this invention, when device 1 moves between the jounce and rebound positions, rolling lobe 50 of upper sleeve 45 will move along cylindrical wall 18 of intermediate member 15 and rolling lobe 54 of lower sleeve 53 will move along cylindrical wall 36 of center member 26 as shown in FIGS. 8 and 9. The circular centers 69 and 70 of lobes 50 and 54 will move along imaginary cylinder 71 maintaining the effective area substantially equal thereby avoiding the introduction of undesirable spring rate characteristics which affects the damping provided by device 1. This maintaining of the effective area avoids uneven pressure being applied to either the upper or lower sleeves causing stretching thereof and effecting the damping characteristics provided thereby.

In accordance with another of the features of the invention, inner radius 73 of elastomeric sleeve 53 is less than the inner radius of cylindrical wall portion 18 of intermediate member 15 which enables cylindrical wall 36 of piston 28 and the connected end of elastomeric sleeve 53 to become nested and slidably received within the interior of intermediate member 15. This is best illustrated in FIG. 9 which shows damping device 1 in a partial rebound position, and when in a further rebound position it is readily seen that the piston will move further into the interior of intermediate member 15.

This nestability of the piston portion of center member 26 within the interior of intermediate member 15, enables the improved damping device 1 to have the same general stroke length as a prior art damper of greater axial length or height in a somewhat similar manner as that achieved by the damping device of U.S. Pat. No. 5,180,145 of which the present invention is an improvement thereon.

When a voltage is applied to electrode 60 through wire 67, the viscosity of fluid 77 changes in relationship to the voltage so that as it passes through orifice 59 the desired damping effect is achieved by device 1 in a manner well known in the art of damping devices using electroviscous liquids.

Figure 10:
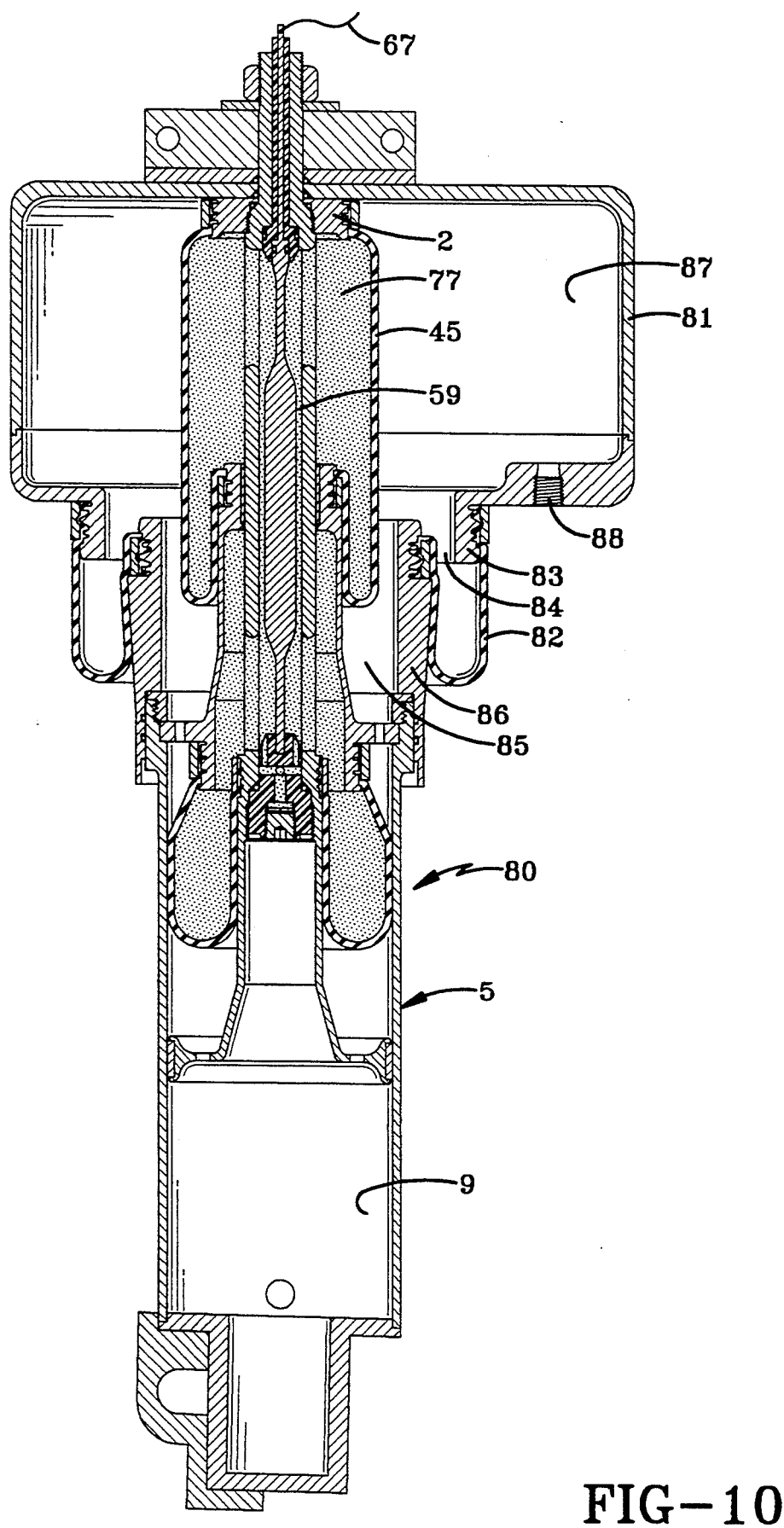
FIG. 10 is a longitudinal sectional view of the damper of FIG. 1, in combination with an air spring.

A modified form of the improved damping device is indicated generally at 80 and is shown in FIG. 10. Device 80 is similar to device 1 described above, and therefore those features in common will not be repeated, but are incorporated herein by reference. Damping device 80 includes a rigid canister or housing 81 which has an inverted cup-shaped configuration and is connected to end plate 2 and extends generally concentrically about first elastomeric sleeve 45.

A third elastomeric sleeve 82 is connected to and is sealed in a fluid tight relationship about an annular flange 83 formed on the bottom of canister 81, which flange forms an open end 84 of canister 81. Sleeve 82 is connected at its other open end to an upper end of an annular collar 86, the lower end of which is secured to the upper end of housing 5. Rigid canister 81 forms a fluid chamber 87 adapted to contain a compressible gas such as air, which may be injected therein through an inlet port 88. In addition to the hollow interior of canister 81, fluid chamber 87 also includes the space 85 formed between annular collar 86 and intermediate member 15, and the hollow interior 9 of lower housing 5.

Modified damping device 80 therefore combines a usual air spring provided by canister 81 and elastomeric sleeve 82, in combination with damping device 1 described above. The air spring provides for the structural support and partial damping for a vehicle or other equipment which is achieved by a usual air spring, in addition to the improved damping provided by device 1 containing the electrorheological fluid flowing through orifice 59.

Figure 11:
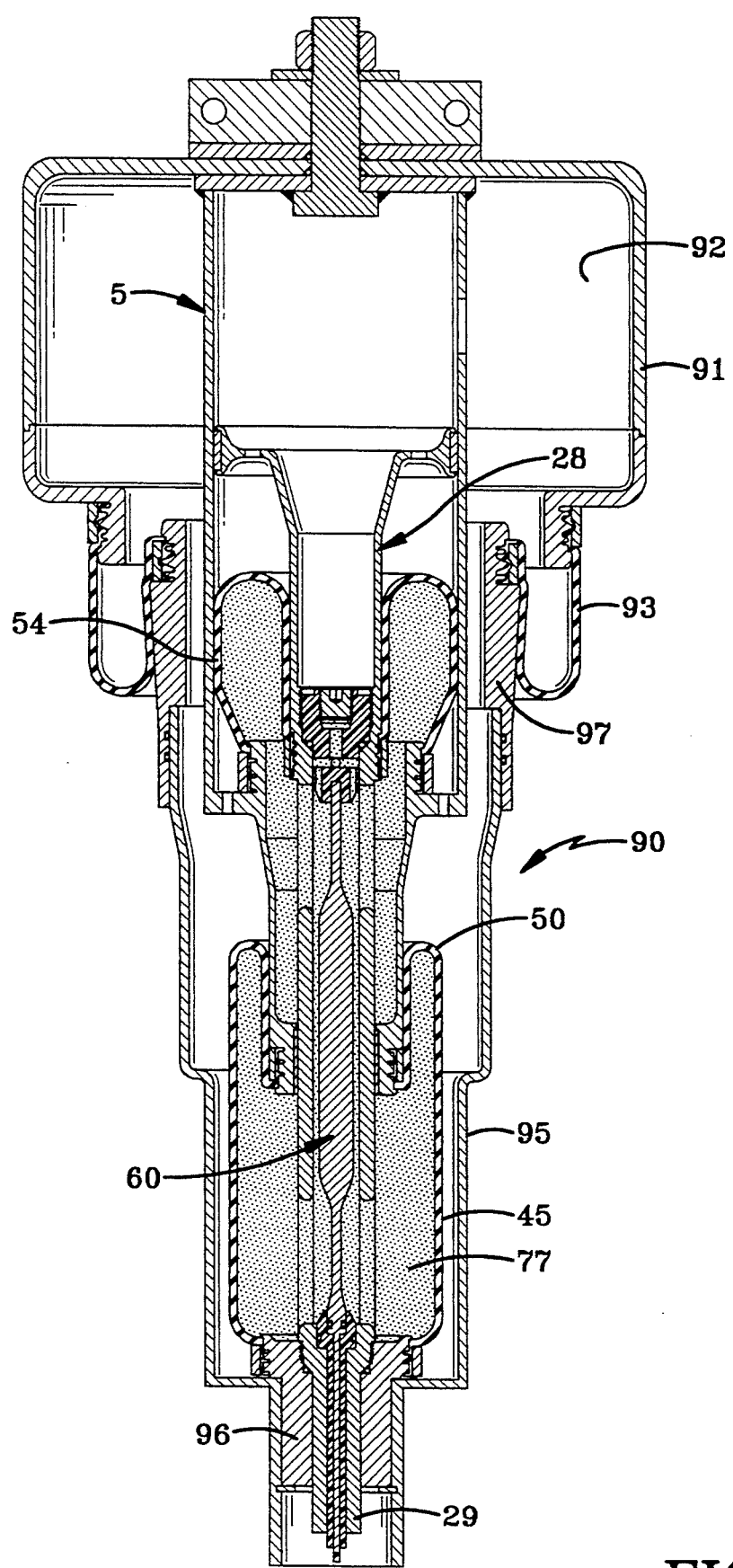
FIG. 11 is a longitudinal sectional view of another embodiment of the damper of FIG. 1, in combination with an air spring.

A third embodiment is shown in FIG. 11 and is indicated generally at 90, and is similar to embodiment 80 with the exception that damping device 1 is inverted from that shown in the embodiment of FIGS. 1–10. In embodiment 90, a first rigid canister 91 is connected to the end of housing 5 and forms a fluid chamber 92 thereabout by use of a third elastomeric sleeve 93. Another rigid canister 95 having a somewhat stepped configuration, is mounted to an end member 96 which is generally similar to end member 2, at one end, and at the opposite end to an annular collar 97 to which one end of elastomeric sleeve 93 is sealingly connected in the fluid tight relationship. This arrangement provides fluid chamber 92, which extends completely throughout the length of the damper and encircles the same, with an increased volume for containment of the compressed air, than that provided by embodiment 80 shown in FIG. 10. Embodiment 90 still provides the same combination air spring characteristics with the damping characteristics of device 1 in a single unit, as does embodiment 80 of FIG. 10, but with a larger volume for containing the compressible air of the air spring.

Figure 12:
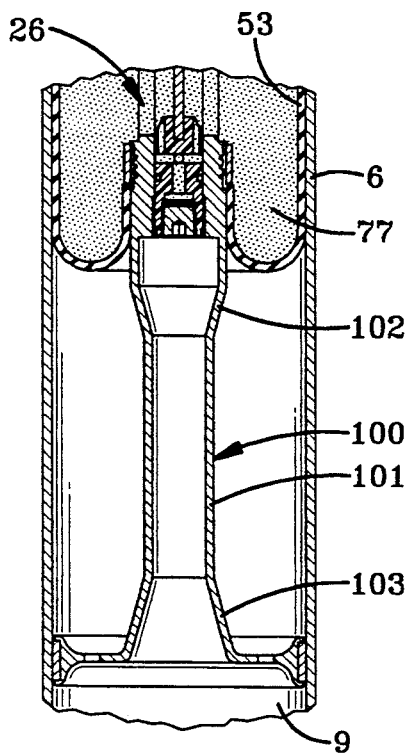
FIG. 12 is a fragmentary sectional view showing a modified piston member of the damper of FIG. 1.
Figure 13:
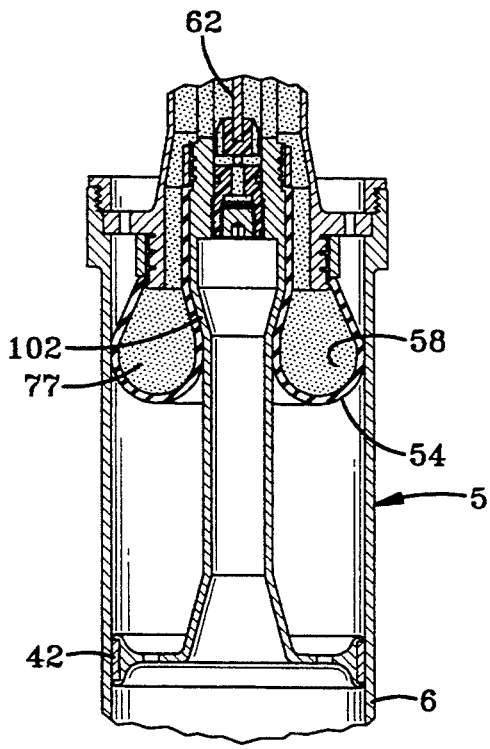
FIG. 13 is a fragmentary sectional view similar to FIG. 12 showing the modified piston when moving toward a jounce position.

Another feature of the invention is shown in FIGS. 12 and 13 in which a modified piston indicated generally at 100, is mounted on the bottom end of center member 26. Piston 100 has a cylindrical central portion 101 and conical upper and lower portions 102 and 103. This arrangement introduces controlled spring rate characteristics, which for certain applications is desirable at certain portions of the stroke. Referring again to FIG. 2, conical portion 39 at the lower end of piston 28 provides for a spring rate or characteristic to be introduced into the damping device as device 1 reaches a full rebound position best shown in FIG. 9. As rolling lobe 54 moves along conical wall 39, the effective area of lower chamber 58 will change with respect to that of upper chamber 51 providing the spring characteristic.

As indicated previously, one of the main features of the invention is to eliminate this spring rate or characteristic by maintaining the effective areas of the two fluid chambers constant by maintaining the equal effective areas of the two chambers by the unique configuration and sizing of the rolling lobes thereof as they move along the cylindrical wall portions of the intermediate member and lower piston. However, it is desirable in certain applications that a spring characteristic be entered as the damping device reaches a full jounce position.

However, piston 100 of FIGS. 12 and 13, in addition to maintaining the equal effective areas throughout the central range of movement of the device by providing cylindrical portion 101, introduces a spring characteristic when the device approaches a full jounce position as shown particularly in FIG. 13, wherein rolling lobe 54 will move along upper conical portion 102.

Figure 14:
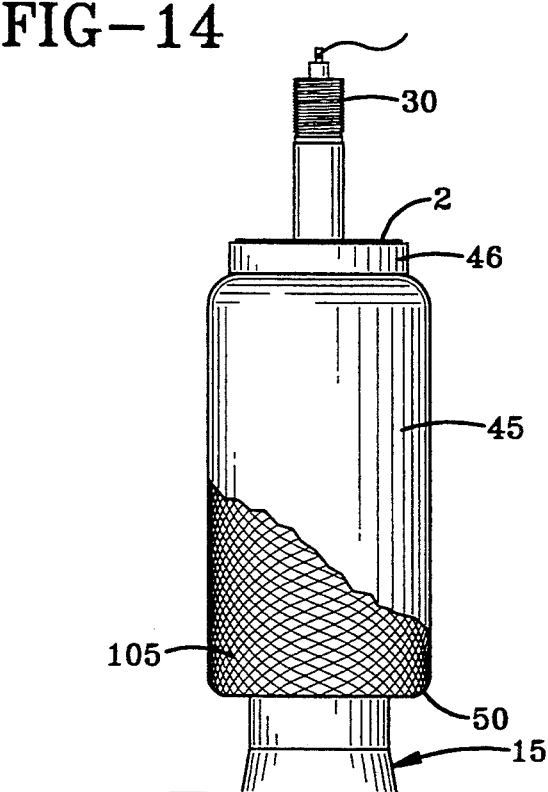
FIG. 14 is a side elevational view similar to FIG. 1 with portions broken away and in section showing the different angles of the reinforcing cords of the two elastomeric sleeves.

FIG. 14 shows a still further modification to the present invention in which upper elastomeric sleeve 45 and lower elastomeric sleeve 53 have internal reinforcing cords at various angles. It has been found that forming top elastomeric sleeve 45 with bias cords indicated at 105, that the effective diameter is easier to control. This also provides a self supporting effect to the sleeve while permitting some flexibility thereto to absorb small vibrations.

However, it is more difficult due to the larger diameter of bottom sleeve 53, to control the effective diameter thereof. Therefore, it has been found that by forming the reinforcing cords 106 therein in a radial direction, it increases the control thereof, and most importantly eliminates problems in the transition area of the rolling lobes.

The angle of bias of cords 105 in sleeve 45 can vary depending upon the particular damping application with which the damping device will be utilized. However, it has been found that by the formation of the smaller diameter elastomeric sleeve 45 with bias reinforcing cords and the formation of the larger diameter sleeve 53 with radial cords, that better control characteristics are achievable than if the same bias ply cord construction was used for both sleeves.

Therefore, the improved damping device of the present invention enables the effective area of the two elastomeric sleeves to be maintained generally constant throughout their normal range of operation in order to reduce or eliminate spring characteristics, yet which is able to introduce the spring characteristics into the damping action upon the damper approaching a full jounce and a full rebound conditions. The improved damper device also enables the same stroke length to be achieved as in prior art damping devices in a shorter axial length structure by providing nestability of some of the internal components thereof, thereby increasing its versatility for mounting within the close confines of vehicle suspension systems. Still furthermore, the improved damping device can be incorporated into an air spring which may have various constructions, to provide a compact unit used for vehicle suspension systems, in which the air spring provides for the support of the vehicle load with the damping device then absorbing most of the road shocks imparted to the vehicle to provide a smooth ride characteristic for the occupants thereof.

Accordingly, the improved vibration damping device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vibration damping device is constructed and used, the characteristics of the construction, and the advantageous, new and useful results obtained; the new and useful structures, devices, elements, arrangements, parts and combinations, are set forth in the appended claims.

We claim:

1. A vibration damping device including:
an end member;
a rigid intermediate member having an annular outer wall extending generally axially from an end wall and terminating in an open end and having a hollow interior, said end wall having a central opening formed therein;
a first elastomeric sleeve extending between and sealingly connected to the end member and to the end wall of the intermediate member and forming a first fluid chamber, said first sleeve having a rolling lobe extending along the annular outer wall of the intermediate member;
a rigid housing having a hollow interior and formed with an open end, said intermediate member being mounted within said open end of said rigid housing;
a piston having a hollow interior formed by an annular axially elongated outer wall, said piston being reciprocally movable within the hollow interior of the rigid housing when the damping device moves between jounce and rebound conditions;
a second elastomeric sleeve extending between and sealingly connected to the intermediate member at the open end thereof and to an end of the piston and forming a second fluid chamber, said second sleeve having a rolling lobe extending within the hollow interior of the rigid housing and along the outer wall of the piston;
a rigid tube having a bore extending between and connecting the end member to the piston, said tube extending through the first fluid chamber and through the central opening of the end wall and through the hollow interior of the intermediate member, said tube being formed with first and second axially spaced fluid passages, said first passage communicating with the first fluid chamber and said second passage communicating with the second fluid chamber;
an electrode mounted within the bore of the rigid tube and electrically isolated therefrom and forming an orifice therebetween; and
the rolling lobes of the first and second elastomeric sleeves having circular centers with first and second radii respectively, with the second radius being greater than the first radius and with the circular centers of the lobes lying on an imaginary axially extending cylinder extending between said lobes.

2. The vibration damping device defined in claim 1 in which the annular outer wall of the intermediate member has a cylindrical axially extending portion which merges into an outwardly flared conical portion.

3. The vibration damping device defined in claim 2 in which the conical portion of the outer wall of the intermediate member communicates with an annular flange; and in which said annular flange is located within the open end of the rigid housing and mounts said intermediate member on said rigid housing.

4. The vibration damping device defined in claim 3 in which the intermediate member has an annular shoulder extending from the annular flange; and in which one open end of the second elastomeric sleeve is sealingly connected to said annular shoulder.

5. The vibration damping device defined in claim 1 in which the elongated outer wall of the piston has a cylindrical axially extending portion which merges into an outwardly flared conical portion.

6. The vibration damping device defined in claim 5 in which the conical portion of the piston terminates in an annular radially extending flange; and in which bearing means is mounted between said annular piston flange and the rigid housing for providing a sliding engagement therebetween.

7. The vibration damping device defined in claim 5 in which the cylindrical portion of the piston outer wall has a smaller outer diameter than an inner diameter of the open end of the intermediate member wherein said piston outer wall moves within the hollow interior of said intermediate member when the damping device moves towards a jounce position.

8. The vibration damping device defined in claim 1 in which the first and second fluid chambers contain an electrorheological fluid.

9. The vibration damping device defined in claim 1 in which dielectric isolators are mounted between the electrode and the rigid tube.

10. The vibration damping device defined in claim 1 in which an annular collar is mounted on and extends about at least a portion of the intermediate member; in which a rigid canister extends about the first elastomeric sleeve and has an open end; and in which a third elastomeric sleeve is sealingly connected to and extends between the open end of the canister and the annular collar to form a third fluid chamber.

11. The vibration damping device defined in claim 10 in which the third fluid chamber communicates with the interior of the lower housing; and in which the third fluid chamber contains a compressible gas.

12. The vibration damping device defined in claim 10 in which the rolling lobe of the first elastomeric sleeve moves within the annular collar when the damping device moves towards a rebound condition.

13. The vibration damping device defined in claim 1 in which the outer wall of the piston has a generally cylindrical intermediate wall portion which merges into a pair of outwardly flared conical end portions.

14. The vibration damping device defined in claim 1 in which the first and second elastomeric sleeves have internal reinforcing cords; and in which the cords of the second sleeve extends substantially parallel to the axis of the damping device, and the cords of the first sleeve are at a bias angle with respect to said axis.

15. The vibration damping device defined in claim 1 in which a first rigid canister extends about the rigid housing and has an open end; in which a second rigid canister extends about the first sleeve and intermediate member and has an open end which affronts the open end of the first canister; and in which a third elastomeric sleeve is sealingly connected to the first and second canister and extends between the open ends thereof to form a third fluid chamber.

16. The vibration damping device defined in claim 15 in which the third fluid chamber contains a compressible gas and encircles the first sleeve, the rigid housing and the intermediate member.

17. The vibration damping device defined in claim 1 in which the second elastomeric sleeve has opposed open ends; and in which the open end that is connected to the piston has a smaller diameter than the open end that is connected to the intermediate member.

18. The vibration damping device defined in claim 17 in which the diameter of the open end of the second elastomeric sleeve which is connected to the piston is smaller than an inner diameter of the open end of the intermediate member to enable a portion of said piston and of said second elastomeric sleeve to move within the hollow interior of said intermediate member when said damping device moves toward a jounce position.

19. The vibration damping device defined in claim 1 in which the rolling lobes of the first and second elastomeric sleeves extend in the same direction.

* * * * *